(12) United States Patent
Ramshaw

(10) Patent No.: US 11,994,164 B2
(45) Date of Patent: May 28, 2024

(54) BEARING UNIT FOR AN AIRCRAFT WHEEL

(71) Applicant: Airbus Operations Limited, Bristol (GB)

(72) Inventor: Andrew Ramshaw, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 17/764,735

(22) PCT Filed: Sep. 29, 2020

(86) PCT No.: PCT/EP2020/077163
§ 371 (c)(1),
(2) Date: Mar. 29, 2022

(87) PCT Pub. No.: WO2021/063907
PCT Pub. Date: Apr. 8, 2021

(65) Prior Publication Data
US 2022/0373023 A1  Nov. 24, 2022

(30) Foreign Application Priority Data

Sep. 30, 2019 (GB) ..................... 1914101

(51) Int. Cl.
*F16C 19/38* (2006.01)
*B64C 25/36* (2006.01)
(Continued)

(52) U.S. Cl.
CPC ............ *F16C 19/548* (2013.01); *B64C 25/36* (2013.01); *F16C 19/383* (2013.01);
(Continued)

(58) Field of Classification Search
CPC ...... F16C 19/386; F16C 19/52; F16C 19/548; F16C 33/6607; F16C 33/78; F16C 35/073;
(Continued)

(56) References Cited

U.S. PATENT DOCUMENTS 2,427,831 A * 9/1947 Bennett ................. F16C 19/548
384/589
3,201,174 A * 8/1965 Stanton ................... B64C 25/36
301/5.1
(Continued)

FOREIGN PATENT DOCUMENTS

| CN | 205 800 638 | 12/2016 |
| CN | 104 608 921 | 12/2017 |

(Continued)

OTHER PUBLICATIONS

International Search Report and Written Opinion of the International Searching Authority for PCT/EP2020/077163 dated Dec. 7, 2020 (17 pages).

*Primary Examiner* — Phillip A Johnson
(74) *Attorney, Agent, or Firm* — Nixon & Vanderhye P.C.

(57) ABSTRACT

A packaged bearing unit is disclosed including an outer surface for receiving an aircraft landing gear wheel and an inner surface for receiving an axle. The unit may include first and second spaced-apart sets of tapered roller bearings, held between inner and outer raceways. There may be a bearing setting spacer which can be used when setting and pre-loading the bearings. The bearing unit may be a sealed unit which includes a pre-set amount of lubricant (grease) for lubricating the bearings. One or more sensors may be retained in a void between the sets of bearings.

8 Claims, 8 Drawing Sheets

(51) Int. Cl.
*F16C 19/52* (2006.01)
*F16C 19/54* (2006.01)
*F16C 25/06* (2006.01)
*F16C 33/66* (2006.01)
*F16C 37/00* (2006.01)

(52) U.S. Cl.
CPC ............ *F16C 19/386* (2013.01); *F16C 19/52* (2013.01); *F16C 25/06* (2013.01); *F16C 33/6607* (2013.01); *F16C 37/007* (2013.01); *F16C 2229/00* (2013.01); *F16C 2326/02* (2013.01); *F16C 2326/43* (2013.01)

(58) Field of Classification Search
CPC .. F16C 35/077; F16C 37/007; F16C 2229/00; F16C 2326/02; F16C 2326/43; F16C 25/083; F16C 19/383; F16C 25/06; B64C 25/36; B64C 25/34
See application file for complete search history.

(56) References Cited

U.S. PATENT DOCUMENTS

| | | | |
|---|---|---|---|
| 3,418,809 | A | 12/1968 | Kopp |
| 4,702,526 | A * | 10/1987 | Sankey ................. F16C 19/525 |
| | | | 301/105.1 |
| 5,386,630 | A * | 2/1995 | Fox .......................... B23P 19/04 |
| | | | 29/898.07 |
| 6,196,639 | B1 * | 3/2001 | Di Ponio .............. B60B 27/001 |
| | | | 301/105.1 |
| 8,893,364 | B2 * | 11/2014 | Rode ....................... B60B 29/00 |
| | | | 29/407.05 |
| 2010/0290731 | A1 | 11/2010 | Proeschel et al. |
| 2016/0090173 | A1 * | 3/2016 | Zabulon .................... G01P 3/36 |
| | | | 244/103 R |
| 2018/0057151 | A1 | 3/2018 | Jaber et al. |
| 2018/0087576 | A1 * | 3/2018 | Bellenger ............... B64C 25/36 |

FOREIGN PATENT DOCUMENTS

| | | | | |
|---|---|---|---|---|
| DE | 10 2007 042 369 | | 3/2009 | |
| FR | 2479382 | A1 * | 10/1981 | |
| NL | 0799723 | A1 * | 10/1997 | |
| WO | WO-2009030200 | A1 * | 3/2009 | ........... B60B 27/001 |

* cited by examiner

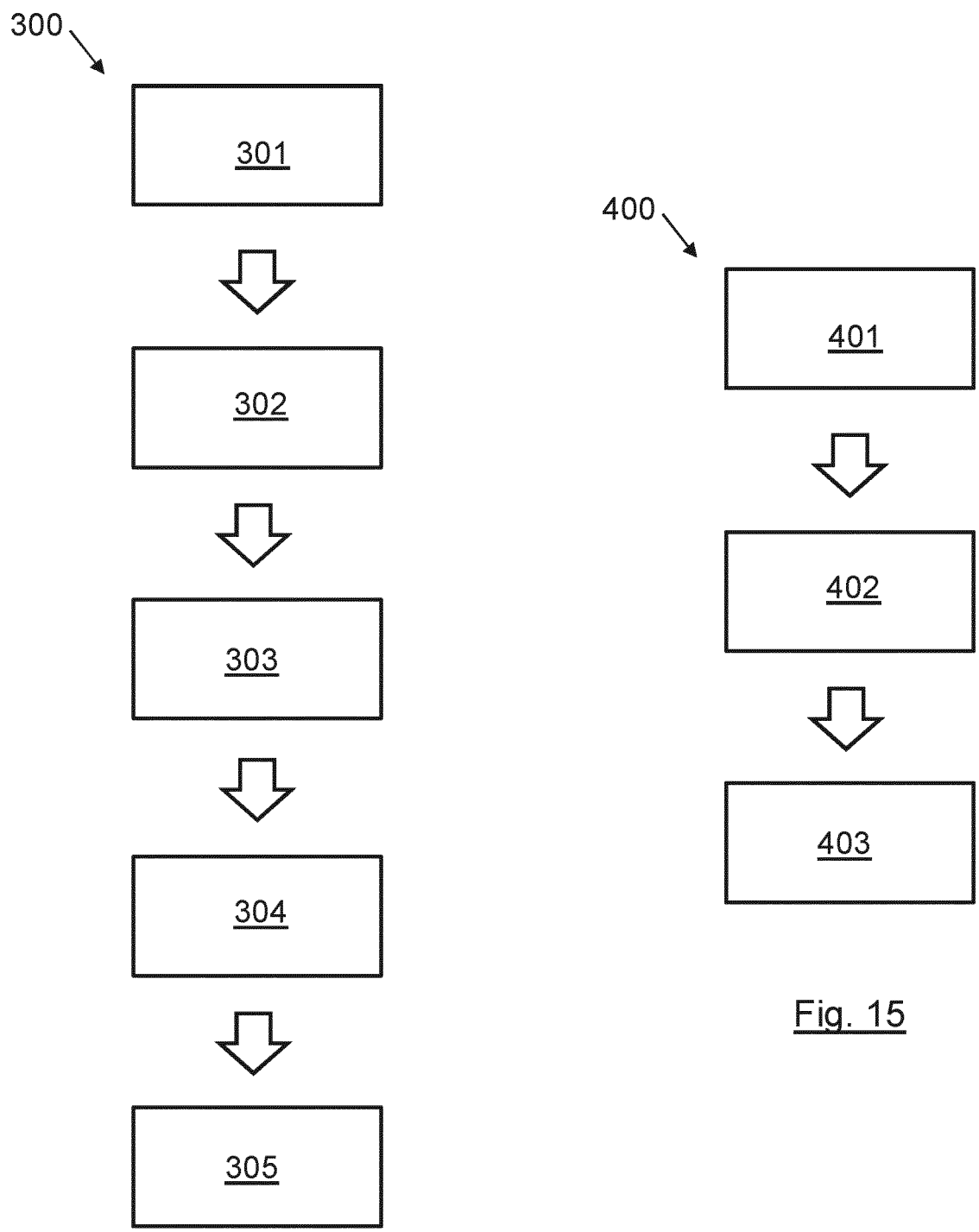

BEARING UNIT FOR AN AIRCRAFT WHEEL

CROSS REFERENCE TO RELATED APPLICATIONS

The present application is a National Phase of International Application Number PCT/EP2020/077163 filed Sep. 29, 2020, which designated the U.S. and claims priority benefits from Great Britain Patent Application Number GB1914101.9, filed Sep. 30, 2019, the entire contents of each of which are hereby incorporated by reference.

BACKGROUND OF THE INVENTION

The present invention concerns a bearing unit for an aircraft landing gear wheel. The invention also concerns a method of assembling/manufacturing a bearing unit, a method of mounting an aircraft wheel on an axle, and a method of servicing an aircraft, or part thereof.

It will be understood that aircraft wheels and their associated axles and bearings are designed to withstand extreme conditions, such as variations in temperature, high loads and large and sudden variations in load.

FIG. 1 illustrates schematically a wheel 110 of the prior art for use on an aircraft landing gear. The wheel typically includes an integrated bearing assembly 112 to allow the wheel to rotate relative to the axle 114, the axis of which being shown by broken line 116. The wheel has two halves 110a, 110b (referred to as a split rim configuration) with a partial hub integrated into each half of the wheel to locate a bearing assembly. Each bearing assembly uses a tapered roller bearing system, with a set of tapered rollers 118. The roller bearings thus comprise a first set 118a of tapered roller bearings associated with one half 110a of the wheel and a second set 118b associated with a second half 110b of the wheel. Each set of roller bearings is between an inner raceway (cone) 120 and an outer raceway (cup) 122. A tyre (not shown) is held between the two halves, which are then bolted together (bolts 124) to create the wheel, tyre and bearing arrangement. The wheel is held on the axle by an axle nut 126, which performs the multiple functions of securing the wheel 110 in place on the axle 114 and preloading the bearings 118 in a set position. FIG. 1 also shows a removable brake pack 128 operated by a brake calliper 130.

Preloading effectively squeezes the bearings within their respective raceways 120, 122 in the axial direction so that the endplay during rotation of the wheel is reduced or minimised. The optimum bearing setting takes account for the mode of operation of the aircraft (i.e. as between any of static load, push back, taxiing, take-off, and-landing) Correctly mounting the wheel and correctly tightening the axle nut 126 with all bearings correctly seated, correctly orientated and preloaded with a correct load requires skill and practice. If the wheel and bearings are assembled in a less than optimum manner, bearing wear can significantly increase. The wheel may then be subject to greater fatigue loading because of misalignments from bearing wear, which can then lead to accelerated seal and tyre wear.

It will also be observed that in an arrangement such as that shown in FIG. 1, it is also important for the two halves 110a, 110b of the wheel to be fitted together accurately and in a repeatable manner. Differences in alignment between the two halves 110a, 110b of the wheel will have knock-on effects on the alignment, setting and preloading of the bearings. A wheel and/or bearings that are not set-up correctly (for example, sufficiently close to the perfect alignment and target positions and with axes of rotation all aligned) can adversely affect the bearing and wheel system in operation.

Modelling of loads within the components of the wheel and its bearings shows that it is often the case that pre-loading of the bearings by means of tightening the axle nut subjects the bearings closer to the nut to more load than the other bearings, as a result of the geometry of the wheel and bearings and the split rim arrangement.

When servicing wheels of the type shown in FIG. 1, it is common practice to remove the bearings from the wheel for servicing and/or inspection. It is typically the case, with wheels of the type shown in FIG. 1, for the bearings to be removed every time the wheel is removed. The brake pack 128 and calliper 130 may be left in situ, during such time. Different sets of bearings may subsequently be paired up with the wheel after servicing, to allow the previous sets to be inspected/serviced and maintained. Mixing up bearing sets and wheels can cause accelerated bearing wear, as the new pairing may cause different wear on the bearing surfaces than a previous pairing. The re-greasing of bearings is a specialised task, requiring the right amount of grease to be located in the correct locations for lubricating the bearings. If there is insufficient grease, the bearings may wear faster. If there is too much grease, there may be a greater chance of increased heat generation, inducing torque, and increased preload due to expansion. This can lead to degradation of the grease/lubricant and/or can purge the grease out, leading to contamination of brakes and/or other detrimental effects.

US2010290731 also discloses an aircraft wheel with an integrated bearing arrangement. The wheel has a split rim that is mounted for rotation about its axis via two rolling bearings, the outer parts of which being integrated with the body of the rim.

Bearings typically require servicing and/or replacing many times during the life of a landing gear assembly. For efficient use of time and resources, the servicing of bearings needs to coincide with the servicing of the wheel and/or brakes.

Modelling of thermal effects, for example as arise when applying braking to a wheel when landing an aircraft, appears to show scenarios in which the pre-loading (and therefore the correct setting of the bearings) is significantly changed as a result of differing thermal expansion of the axle and parts of the wheel. The compressive load on the bearing closest to the axle nut may reduce, potentially leading to end-play and therefore greater wear. The modelling also shows that the other bearings (further from the axle nut) may shift towards the axle nut, as a result of being closer to the heat generated by the brake pack. Again, this may result in a less than ideal setting of the bearings, resulting in greater wear.

It has become customary in the art (of the aircraft industry) to treat the inspecting/maintenance/servicing of bearings as something which should be done at intervals that are identical to, or comparable with, the number of cycles an aircraft performs before a tyre and/or wheel change. Bearings have therefore needed to be readily visible and/or accessible and/or removable for such purposes, and it has been convenient for the bearings to remove with the wheel. The manufacture/assembly of wheels for an aircraft thus typically involves integrating the bearings with the wheel. The bearings are considered to belong to the wheel, and thus the manufacturer of an aircraft wheel will typically be the same entity responsible for bearing design and manufacture, resulting in an interdependence on the design of the wheel and the design of the bearings that are to be integrated therewith. While in other industries—e.g. road vehicles—it is common for wheels to be provided separately from the bearing systems with which they are used, this is not the case in the aircraft industry at least for the reasons mentioned above. There may be something of a prejudice in the art (design of commercial passenger aircraft of a certain size) against deviating from the well-established design of wheel and associated bearings of the type illustrated in FIG. 1. Furthermore, with the regular servicing of wheels and their associated bearings, it is perhaps accepted within the aircraft industry that bearings regularly wear, and regularly need maintaining and replacing. Recognising that wheels and/or bearings could be designed better represents a step away from the existing state of the art.

It is desirable to reduce the turnaround time that is required between landing an aircraft and subsequently taking-off with a new set of passengers. The shortened turnaround times that are now common place extra constraints on attending to the aircraft wheels between flights. The wheels, bearing and brake packs on the aircraft are often significantly hotter than ambient temperature shortly after landing. Thermal expansion may be a factor that needs to be accommodated for. Maintenance and servicing of the wheel and bearings may often take place when the existing wheel and bearings are at temperature far greater than either those that will exist on the next landing of the aircraft or than the temperatures of any replacement parts to be fitted.

The present invention seeks to mitigate one or more of the above-mentioned problems. Alternatively or additionally, the present invention seeks to provide an improved aircraft wheel and bearing arrangement and/or to improve servicing of aircraft wheels and/or bearings. Alternatively or additionally, the present invention seeks to provide an aircraft wheel and/or bearing arrangement with a longer lifetime.

SUMMARY OF THE INVENTION

The present invention provides, according to a first aspect of the invention, a bearing unit for an aircraft landing gear wheel. The bearing unit has an outer surface for receiving an aircraft wheel and an inner surface for receiving an axle, the axle optionally including a separated sleeve which defines the outer surface of the axle. The bearing unit comprises first and second sets of tapered roller bearings. The sets of roller bearings are spaced apart in an axial direction. Each set of roller bearings is held between an inner raceway and an outer raceway. The unit may also comprise a bearing setting spacer, for example in the form of a structure having a set length in the axial direction. Such structure may be formed as part of one or more of the raceways (for example, the structure performing the function of the bearing setting spacer may comprise an extension of the cone of a set of roller bearings). Alternatively, the spacer is provided separately, which may be preferred if a cheaper material is used for the spacer. The bearing unit and the spacer are so configured that when the spacer is secured in position (e.g. clamped by means of an axial force acting to compress the spacer), the spacer dictates the separation in the axial direction of the first set of tapered roller bearings from the second set of tapered roller bearings. The spacing is preferably such that the roller bearings of the unit are configured in a set (e.g. correctly seated) and pre-loaded position (for example, with optimum setting achieved). Thus, in embodiments of the invention, the act of correctly mounting the wheel on the axle is decoupled from the act of correctly seating and preloading the bearings. In such embodiments, the spacer enables the roller bearings to be reliably and repeatably set up in an accurate and precise manner with correct seating and with correct pre-load. The geometry of the roller bearings, the inner and outer raceways, and the spacer is such that the correct amount of preload is supplied at the point at which the spacer starts to undergo compression. Such a set-up of the bearings may be performed once, allowing many wheel replacements to occur without needing to repeat a set-up of the bearings. The bearing unit comprises both the first and second sets of the tapered roller bearings required for mounting the wheel for rotation about the axle and is thus referred to herein as a packaged bearing unit.

One or both of the inner and outer raceways may be formed as an integrated part of the bearing unit structure. For example, at least one inner raceway may be part of the same structure of the bearing unit that defines at least part as the inner surface of the bearing unit, which receives the axle (for example the inner raceway may be integrally formed with that inner surface). At least one outer raceway may be part of the same structure of the bearing unit that defines at least part as the outer surface of the bearing unit that receives the wheel (for example the outer raceway may be integrally formed with that outer surface).

The bearing unit may include within it a pre-set amount of lubricant (e.g. grease) for lubricating the roller bearings. Such lubricant may be retained within the unit by one or more seals. The seals may be provided as an integrated part of the bearing unit. The provision of a set amount of lubricant that, for example, need not be replaced or renewed every time a wheel is removed/serviced (as is common in the prior art) removes the risk associated with ground crew applying too much or little grease and/or such grease being contaminated with unwanted debris or particulate matter that could affect bearing performance.

The bearing unit may comprise a clamping arrangement (for example comprising a first nut) for clamping and/or preloading (for example, retaining preloading) and/or achieving the required setting of the first and/or second sets of tapered roller bearings. Such a clamping arrangement may include the bearing setting spacer. The clamping arrangement is preferably configured to make it straightforward for performing the setting and/or preloading (with a desired axial load) of the roller bearings. The clamping arrangement may also be configured to assist in securing the bearing unit on the axle. For example, the clamping arrangement may include a first nut for clamping and/or preloading and/or setting the tapered roller bearings and for securing the bearing unit to the axle. There may be a further fixing (for example a second nut), separate from the clamping arrangement, for securing a wheel to the bearing unit. Thus, the bearing unit may be arranged such that the amount of pre-loading of the tapered roller bearings can be controlled independently of the mounting of a wheel on the axle of an aircraft landing gear. There may be fixings for staking the axle nut, for example one or more axle nut stake bolts. The mounting of the wheel on the axle in the correct position (and/or the way in which loads are designed to be reacted) may be improved by changes to the design of the wheel and the further fixing without compromising the design and function of the clamping arrangement. The bearing unit may include a flange, for example on, or integrally formed with, its outer surface, the flange being arranged to abut against, preferably assisting in the securing of, the wheel to the bearing unit. A flange of the bearing unit for securing the wheel to the bearing unit may for example include a formation that allows a wheel to be keyed to the bearing unit. The flange may for example have one or more interfaces for engaging the wheel which provide additional location (i.e.

keep the wheel securely fastened so that it rotates with the outer surface of the bearing unit).

The bearing unit may include a void between the first set of tapered roller bearings and the second set of tapered roller bearings. The void may be sealed off from the elements, for example. The bearing unit may include one or more sensors, for example integrated with the bearing unit. Optionally, the one or more sensors may be provided within the body of the bearing unit, for example in the void mentioned above. One or more sensors, or a part thereof, may be fixed to structure that moves with the outer surface of the bearing unit. One or more sensors, or a part thereof, may be fixed to structure that moves with the inner surface for receiving the axle. The one or more sensors may, by being located in the void, be positioned within a protected environment which does not need to be frequently removed from the wheel. Sensors of the prior art which are located on or in another component can be adversely affected, for example, by being taken on and off at every wheel change. Such sensors may, for example, lose connection with other sensors or parts of a wider system as a result of being removed and/or possibly as a result of being replaced by a different sensor of the same type when a wheel is replaced. Damage can occur when such sensors are removed and/or when exposed to harsh operating conditions. In embodiments in which the one or more sensors are embedded in the bearing unit, the risk presented by such factors can be reduced.

An embodiment of the invention relates to a packaged bearing unit for an aircraft landing gear wheel, the packaged bearing unit having an outer surface for receiving an aircraft wheel and an inner surface for receiving an axle, the unit comprising: (a) a first set of tapered roller bearings, (b) a second set of tapered roller bearings, spaced apart in an axial direction, each set of tapered roller bearings, being held between inner and outer raceways, and (c) one or more sensors located at least partially within a void (preferably a protective void defined by structure of the bearing unit) formed between the first set of tapered roller bearings and the first set of tapered roller bearings.

The roller bearings may comprise ceramic roller bearings. The roller bearings may comprise silicon nitride bearings. The roller bearings may comprise diamond material, for example a synthetic diamond coating.

The bearing unit may comprise one or more thermal barriers 23 (for example reducing the thermal conductivity of certain thermal paths across the bearing unit). The thermal effects of brake temperature on the performance of the wheel may be reduced because the setting of the bearings may be less prone to changes due to thermal expansion or contraction of the wheel. The thermal barrier may comprise a thermal barrier coating including a thermally-grown oxide (TGO) layer and/or a ceramic top coat. The thermal barrier may be formed on an outer raceway of the bearing unit.

An embodiment of the invention relates to a packaged bearing unit for an aircraft landing gear wheel, the packaged bearing unit having an outer surface for receiving a wheel for an aircraft and an inner surface for receiving an axle, the unit comprising: a first set of tapered roller bearings, a second set of tapered roller bearings, spaced apart from the first set in an axial direction, each set of tapered roller bearings, being held between inner and outer raceways, and a thermal barrier arranged to reduce the flow of heat energy from brakes associated with the wheel to one or more of the set of tapered roller bearings.

The bearing unit may be provided with the bearings set and under pre-load ready for operation. In some embodiments, the bearing unit may be provided with the bearings set and under pre-load ready for mounting on an axle of an aircraft landing gear (i.e. ready for mounting on the axle, but provided in an unmounted state—i.e. not on an axle). In some embodiments, the bearing unit may be provided with the bearings set and under pre-load mounted on an axle, or a sleeve for an axle, and ready for receiving a wheel.

The bearing unit and axle may be provided with a release mechanism for assisting in removing the bearing unit from an axle. For example, the axle may be provided with one or more passageways for carrying fluid, in a manner which exerts pressure onto the interior surface (e.g. internal diameter) of the bearing unit and thus assist in removing the bearing unit from the axle.

The packaged bearing unit may be suitable for use on a wheel of a commercial passenger aircraft, for example an aircraft suitable for transporting at least 50, for example at least 100, for example at least 200 passengers. For the purposes of the present specification the term commercial passenger aircraft also covers aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

The present invention also provides a method of manufacturing and/or assembling a bearing unit for an aircraft landing gear axle and/or aircraft wheel, for example a bearing unit in accordance with any aspect of the present invention as claimed or described herein. The bearing unit may be a sealed bearing unit for example. The method may include a step of arranging a first set of tapered roller bearings and/or a second set of tapered roller bearings in an unloaded position and being spaced apart from each other along an axis. The distance of separation may be determined by a spacing structure being so arranged that (e.g. having appropriate dimensions and/or sufficient rigidity/compressive strength) when the first set of tapered roller bearings and second set of tapered roller bearings are urged together, the spacing structure is under axial compression when the correct axial preload (and correct setting) for the tapered roller bearings is applied. There may be a step of adding a pre-determined amount of lubricant to the first set and/or the second set of tapered roller bearings. One or more seals may be used to retain the predetermined amount of lubricant within the bearing unit. There may be a step of causing the first set of tapered roller bearings and the second set of tapered roller bearings to be urged together so as to subject the spacing structure to axial compression, for example thus placing the tapered roller bearings into a desired preloaded condition—e.g. ready for and in advance of mounting an associated wheel on an axle of an aircraft landing gear.

The present invention also provides a method of mounting a wheel on an axle of an aircraft landing gear, for example with the use of a bearing unit in accordance with any aspect of the present invention as claimed or described herein. The bearing unit may for example include a pair of axially spaced apart sets of tapered roller bearings. There may be a step of moving a wheel into position on the outer surface of a bearing unit that has bearings allowing rotation about an axis between the outer surface and an inner surface of the bearing unit, the inner surface being secured in a fixed position relative to the axle. The bearings of the bearing unit may have been pre-set with a preload and lubricated with grease contained within the sealed bearing unit. The method may include a step of fixing the wheel in place relative to the outer surface of the sealed bearing unit. The wheel may be associated with a brake pack assembly. The wheel, the bearing unit, and/or the brake pack assembly may be configured to permit removal of the wheel from the axle independently of the brake pack assembly and/or independently of the packaged bearing unit. The method may include a step of applying the preload to the bearings of the bearing unit in advance of moving the wheel into position on the outer surface of the bearing unit. The method may include a step of fixing the bearing unit to the axle before moving the wheel into position on the outer surface of the bearing unit.

The present invention also provides a method of servicing an aircraft including a landing gear assembly having an axle on which there is mounted a wheel, an associated bearing assembly and an associated brake assembly. The bearing assembly may be a bearing unit in accordance with any aspect of the present invention as claimed or described herein. There may be a step of removing the wheel and the associated brake assembly from the landing gear assembly, for example leaving the associated bearing assembly in situ. There may be a step of providing a serviced wheel and associated brake assembly by performing one or both of (a) replacing one or both of the wheel and associated brake assembly with a different one and (b) checking, maintaining and/or repairing one or both of the wheel and associated brake assembly. There may be a step of mounting a serviced wheel and associated brake assembly on the landing gear assembly using the same bearing assembly. The associated bearing assembly may remain in situ on the axle during the performance of the entire method. The servicing of the wheel and/or associated brake assembly may be repeated at least ten times before the associated bearing assembly is inspected and/or serviced. The servicing interval for the bearing assembly may be as long as the least frequently serviced parts of the landing gear for example. The bearings do not need to be re-greased each time a wheel is replaced. Turnaround times for an aircraft may be reduced as a wheel and tyre can be replaced, and secured in the correct position on the bearing unit, without the need for the time-consuming and skilled process of setting and preloading the bearings. Also, temperature variations that might need to be lessened (which takes time) in order to enable the wheel to be correctly fitted and located, and for the bearings to be correctly set and preloaded, may be less of a problem, given that the bearing unit of embodiments of the present invention does not need to be set up each and every time a wheel is replaced.

The invention also provides an aircraft, or part therefor, comprising a landing gear on the axle of which is mounted a bearing unit in accordance with any aspect of the present invention as claimed or described herein, possibly including any or all optional features relating thereto.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 14 is a flowchart illustrating the steps of a method of manufacturing a sealed bearing unit in accordance with a third embodiment; and FIG. 15 is a flowchart illustrating the steps of servicing of an aircraft wheel in accordance with a fourth embodiment.

DETAILED DESCRIPTION

The embodiments generally relate to an aircraft wheel for a landing gear ("LG") and an associated bearing unit, which is provided separately from the wheel, for providing the rotational bearing interface between LG axle and wheel. The bearing unit is provided as a packaged unit and once set up, with correctly seated bearings with the correct pre-load, can remain on the axle—possibly for the lifetime of the LG—but at least for the duration of a significant part of the lifetime of the LG during which the wheel and/or associated brakes may be serviced, maintained and/or replaced multiple times. Any wheel can then be removed, with or without its associated brake pack, leaving the bearing unit in place on the LG axle. The bearing unit will not need assessing or servicing unless a sufficiently significant event has happened, such as a very hard landing for example, warranting a precautionary inspection. The bearing unit is thus treated both technically and commercially as an independent product, as compared to the wheels with which it is designed to be used. As a result of packaging the bearings in this manner, it may also be possible to enable higher loads within a smaller space envelope. It may also provide an improved load path (from the tyre through the bearing system architecture to the axle) for transferring static and dynamic loads. It may also reduce static and rotational un-sprung weight imbalance and/or reduce the chance of misalignment of the bearing system architecture and/or reduce system stress, and/or reduce tyre wear.

Figure 1:
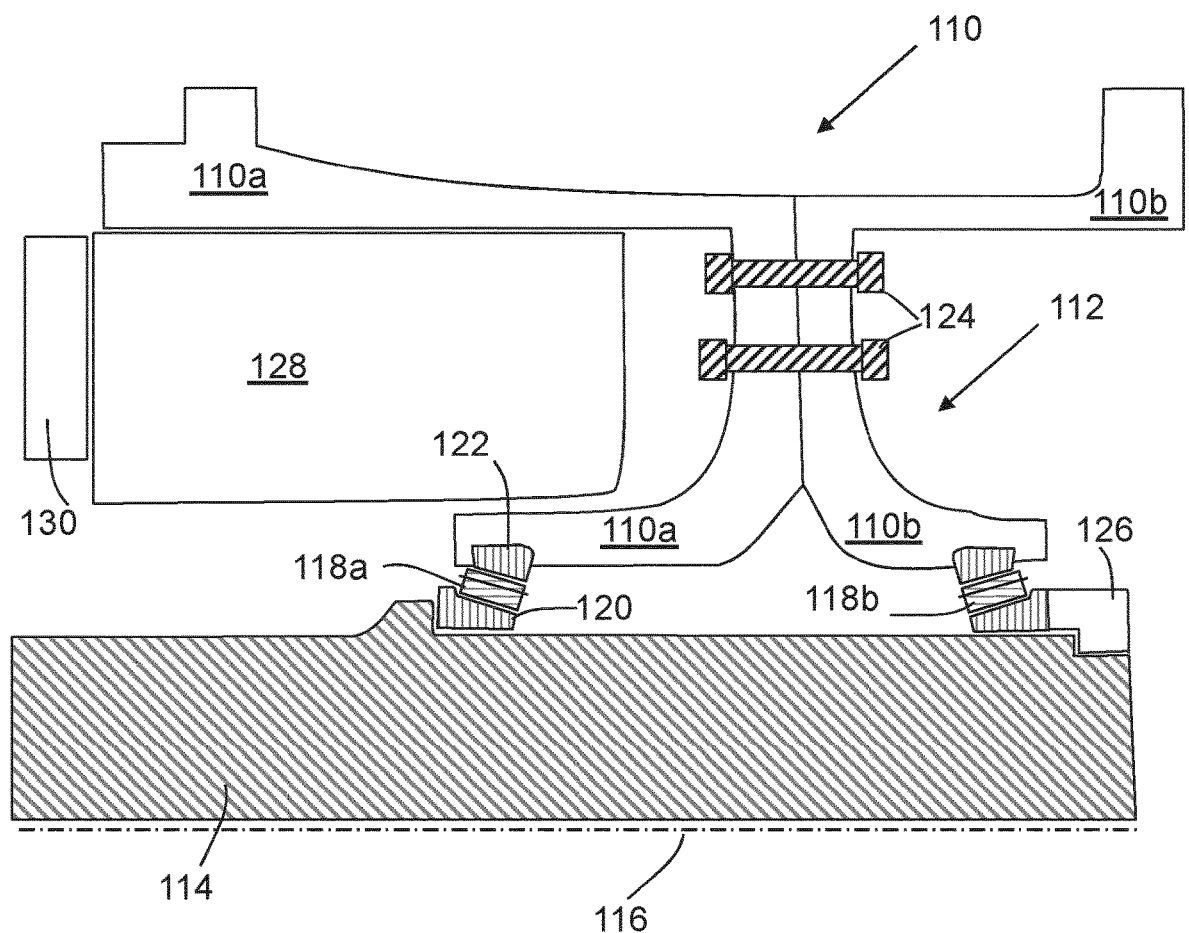
FIG. 1 shows in cross-section an aircraft wheel of the prior art.
Figure 2:
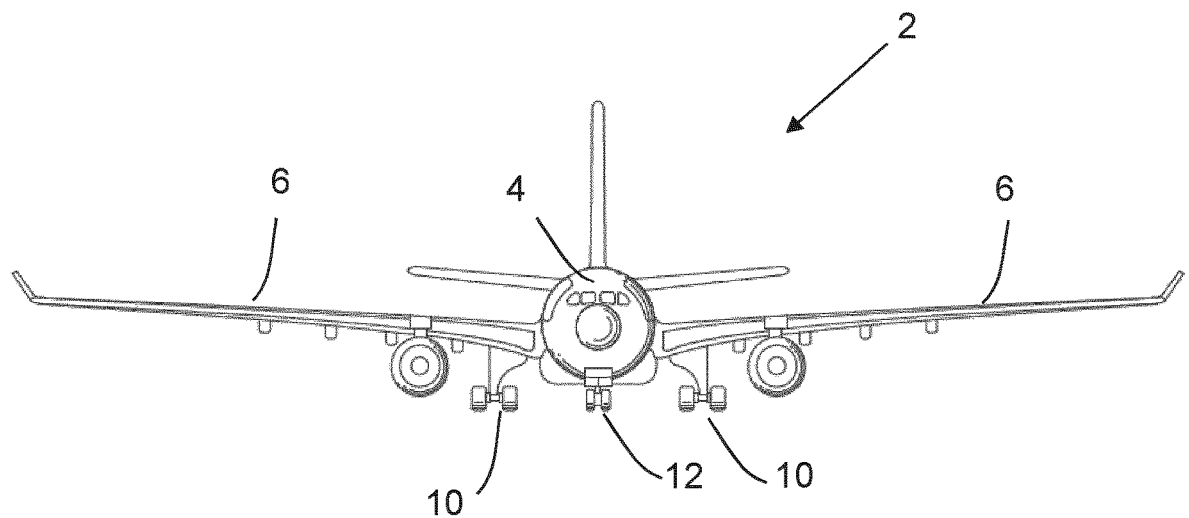
FIG. 2 is a front view of an aircraft according to a first embodiment of the invention, the aircraft including a wheel and associated bearing unit.
Figure 3:
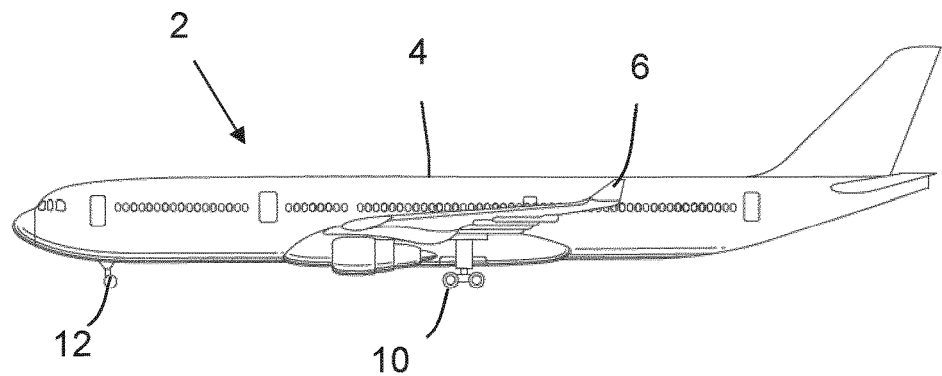
FIG. 3 is a side view of the aircraft shown in FIG. 1.

FIGS. 2 and 3 show an aircraft in accordance with a first example embodiment. The aircraft 2 comprises a fuselage 4 and wings 6. A nose landing gear ("NLG") 12 is mounted on the fuselage 4 and a main landing gear ("MLG") 10 is mounted to each wing 6. Both NLG and MLG are retractable into respective landing gear bays on the aircraft. All LG on the aircraft could utilise the benefits of the present embodiment, but the description that follows will refer by way of example only to a MLG and its associated axle, wheel, bearing and brakes.

Figure 4:
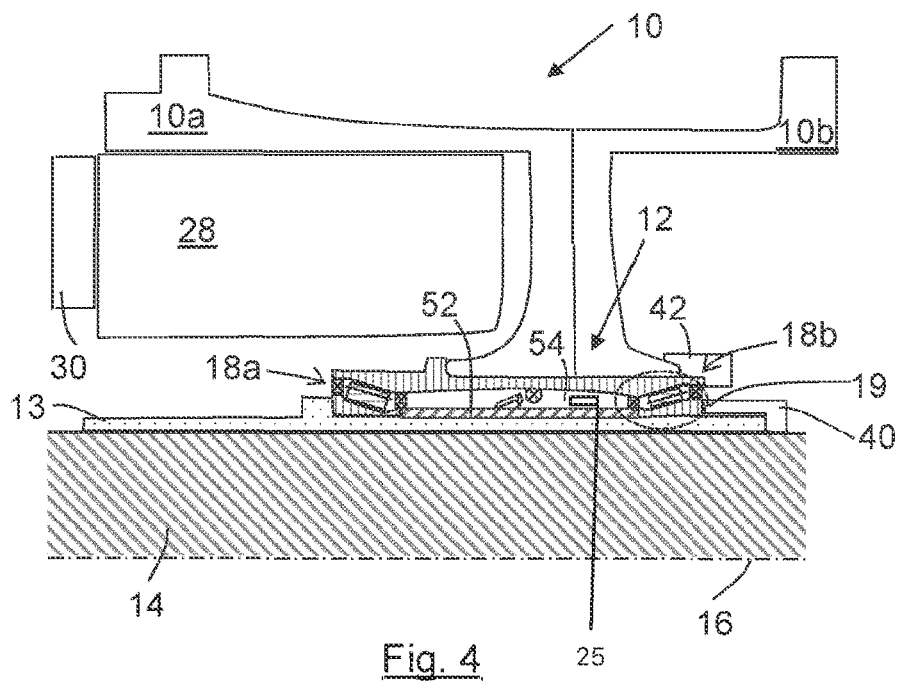
FIG. 4 shows in cross-section the aircraft wheel and associated bearing unit of the first embodiment.

FIG. 4 shows a wheel 10 of MLG of FIGS. 2 and 3 including a bearing unit 12 according to the first embodiment. The bearing unit 12 is mounted to an axle 14 via a sleeve 13. The bearing unit 12 allows the wheel to rotate relative to the axle 14, the axis of which being shown by broken line 16. The split rim wheel has two halves 10a, 10b, which define a rim which carries a tyre (not shown). The bearing unit 12 is secured to the sleeve by means of a bearing nut 40. The wheel is held on the bearing unit by a wheel nut 42. The wheel 10 is associated with a removable brake pack 28 operated by a brake calliper 30.

Figure 5:
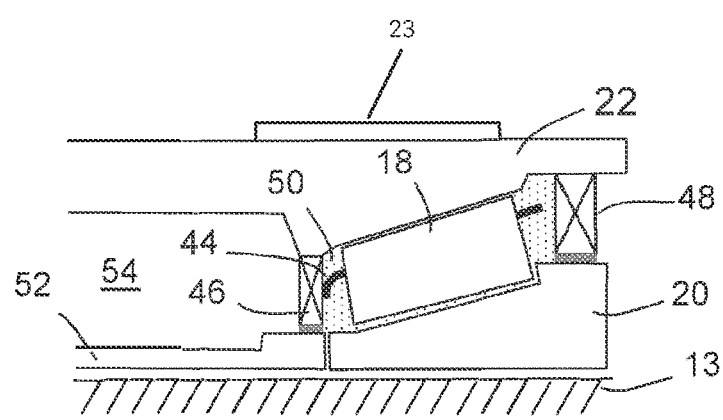
FIG. 5 shows an enlarged portion of FIG. 4.

The bearing unit 12 is provided as a single sealed unit integrating two sets of tapered roller bearings. The roller bearings thus comprise a first set 18a at a first location along the axis 16 and a second set 18b spaced along the axis at a second location. Each set of roller bearings is held between an inner raceway and an outer raceway. The rollers are silicon nitride bearings and therefore extremely hard-wearing. FIG. 5 shows an enlarged view of the second set 18b of rollers (enlarging the area shown by dashed oval 19 in FIG. 4). The rollers 18 are held between an inner raceway (or cone) 20 and an outer raceway (or cup) 22. The rollers are held in spaced apart position circumferentially around the axis 16 by a cage 44. Two seals 46, 48 are attached to and rotate with the outer raceway 22, in sealing engagement with the inner (fixed) raceway 20. A precise amount of grease 50 is provided which is sealed in by the seals 46, 48. A spacer 52 sets the axial separation of the sets 18 of bearings and assists in setting the preload as will be described in further detail below. A void 54 is provided between the innermost seals 46.

Figure 6:
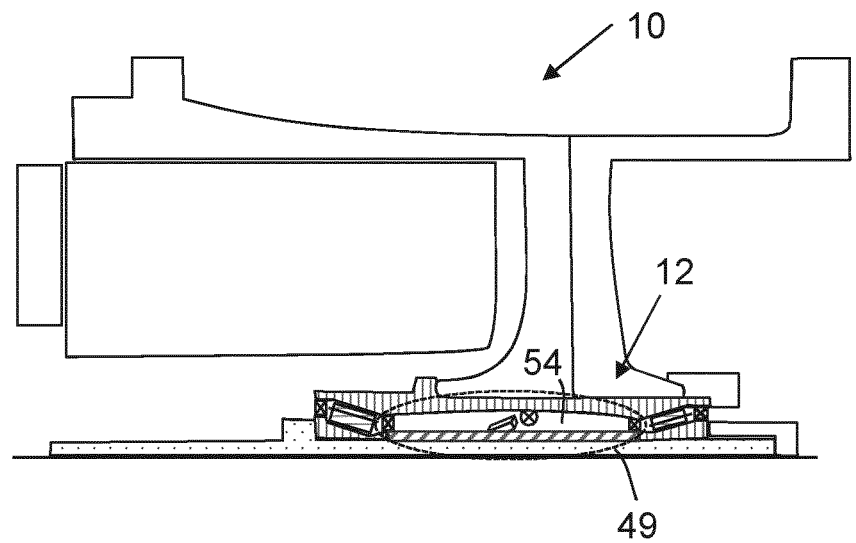
FIG. 6 shows in cross-section the aircraft wheel and associated bearing unit of the first embodiment.
Figure 7:
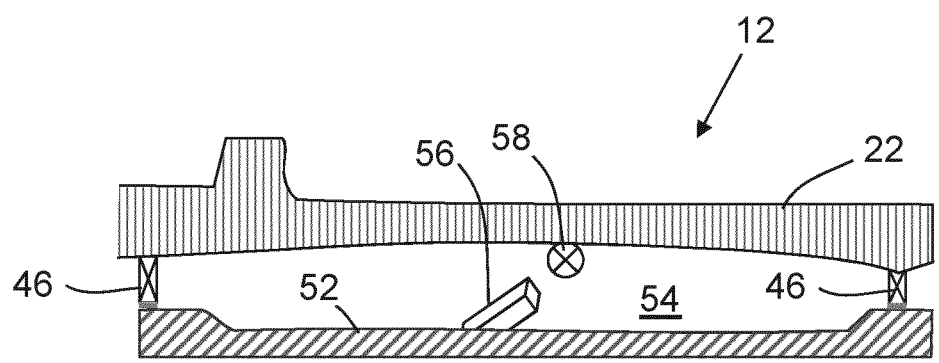
FIG. 7 shows an enlarged portion of FIG. 6.

FIG. 7 shows an enlarged view of the void 54 and the surrounding structure (enlarging the area shown by dashed oval 49 in FIG. 6, which shows the same wheel 10 and bearing unit 12 as shown in FIG. 4). Inside the void 54 are provided multiple sensors, including one sensor set 25 including a rotation detector 56 and an associated target device 58. The rotation detector 56 is fixed to the spacer 52 and therefore fixed relative to the axle. The target device 58 is fixed to the outer raceway structure 22 and therefore rotates with the wheel. The rotation detector 56 is arranged to detect the passing of the target device 58 so that a 360 degree rotation of the wheel can be reliably detected. The void is sealed from the outside environment and therefore sensors in the void are protected from brake debris, moisture and/or other elements that might otherwise affect the operation of such sensors.

Figure 8:
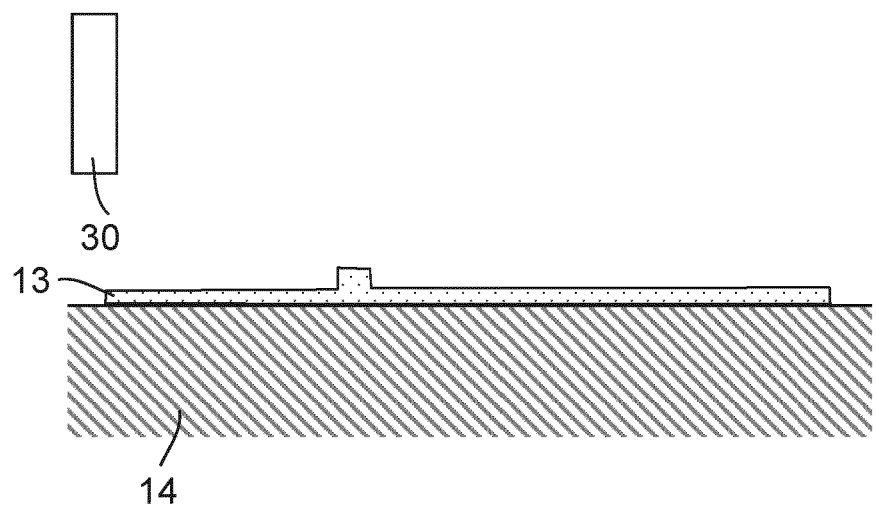
FIGS. 8 to 12 illustrate a method of installing a bearing unit and wheel of the first embodiment.

The mounting and preloading of the bearing unit and wheel of the first embodiment will now be described with reference to FIGS. 8 to 12. In the step shown by FIG. 8, the sleeve 13 is mounted and secured to the axle 14. The sleeve 13 keys into the axle (the keying-in structure not being shown in the Figures), forms a close fit with the axle 14 and is bolted into place (fixings not shown). FIG. 8 shows schematically the presence of the brake calliper 30, which is already attached to the MLG.

Figure 9:
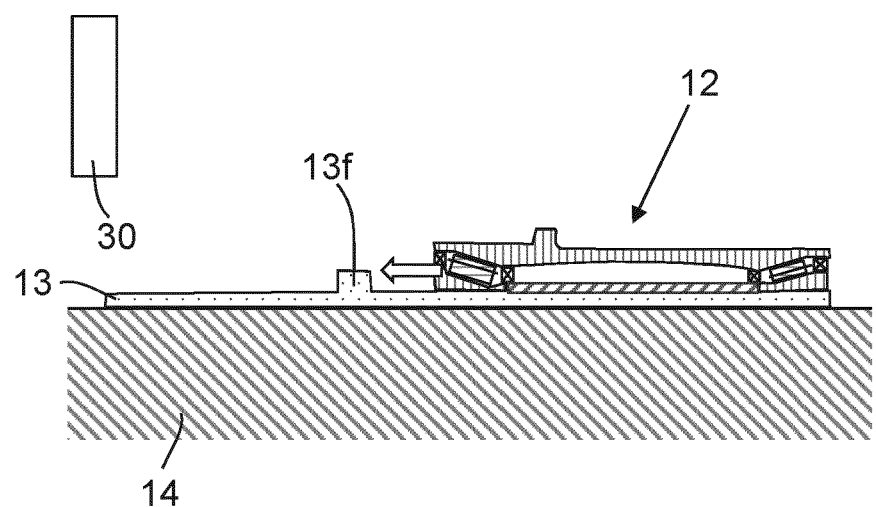
Figure 10:
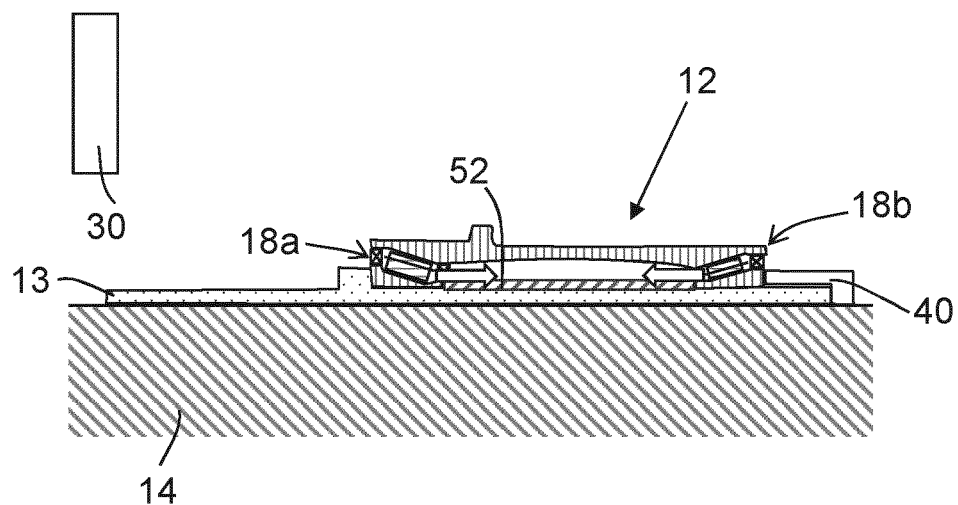

In the step shown by FIG. 9, the bearing unit 12 is supplied and pushed onto the sleeve 52, until it abuts a flange 13f on the sleeve—as shown in FIG. 10. Then the bearing nut 40 is tightened. The geometry of the roller bearings, the inner and outer raceways and the spacer 52 is such that the correct amount of preload is supplied at the point at which the spacer 52 starts to undergo compression as a result of the axial forces exerted by the bearing sets 18a, 18b at each end. Further tightening of the nut 40 loads the spacer 52 rather than the bearings, so it is relatively straightforward to tighten the nut to a torque that applies the correct preload to the bearings, with a reduced risk of excessive load on the bearing rollers. Once the nut 40 is so tightened, both sets of bearing rollers are corrected seated and correctly loaded. The spacer 52 thus dictates accurately—with the required precision—the separation in the axial direction of the first set of tapered roller bearings from the second set of tapered roller bearings, thus enabling the roller bearings of the unit to be accurately and precisely configured in a correctly set position (correctly seated) and correctly pre-loaded, independently and separately from the fitting of the wheel on the axle. This may enable any variation in setting to be reduced or minimised and may also enable improving or optimising location and load path.

The bearing unit is provided as a packaged and sealed unit, with the correct amount of grease provided for each bearing set. The seating of the bearings and the preload on the bearings is known to be correct and unlikely to change. Wear of the bearings can thus be reliably predicted and the bearings can be designed to have a servicing interval many times longer than wheel/brake servicing intervals. The bearing unit need not be removed or serviced, barring exceptional events, any more frequently that the landing gear structure.

Figure 11:
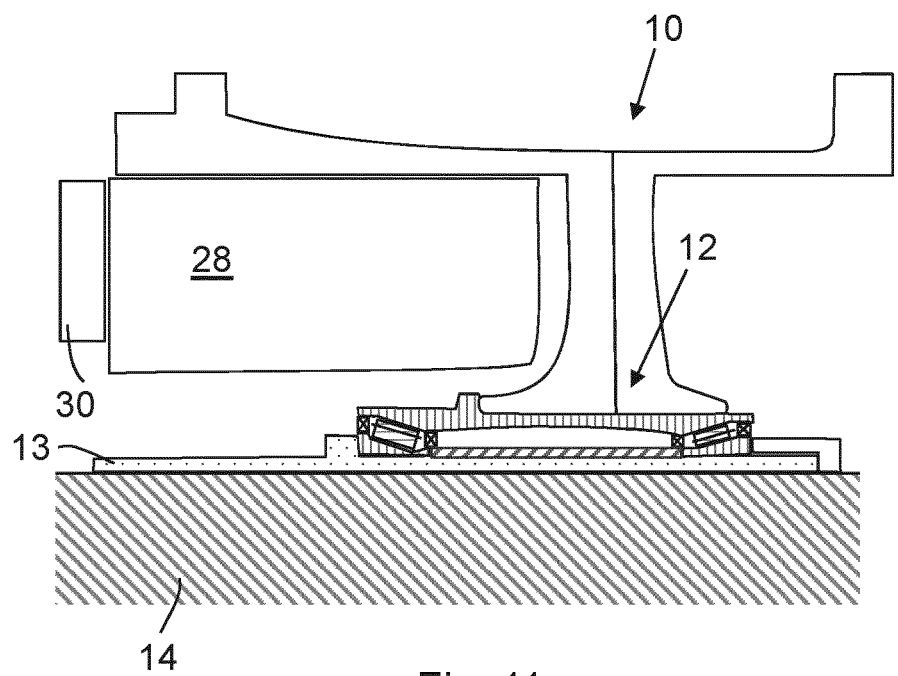
Figure 12:
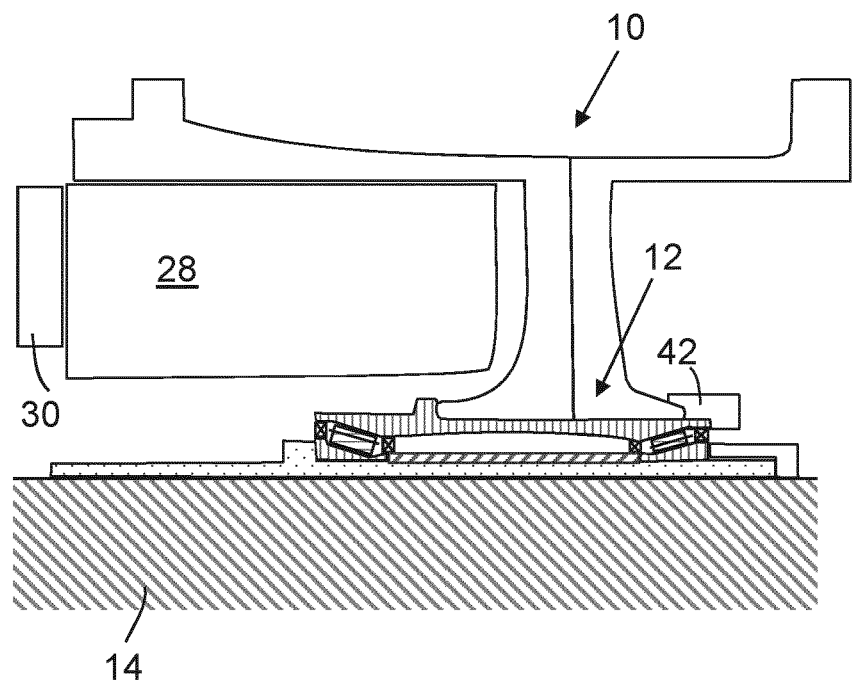

A wheel 10 and associated brake pack 28 may then be mounted on the bearing unit 12 as shown in FIG. 11, and fixed in place with a wheel nut 42 as shown in FIG. 12. Tolerances between the halves of the wheel 10 and/or resulting from the torque applied to the nut 42 will have little or no influence on the performance of the bearings of the bearing unit 12.

The bearing unit is designed such that the variation in bearing performance is reduced because setting and pre-loading is better controlled, the correct quantity of lubricant is guaranteed and a protected environment is provided by the seals.

Figure 13:
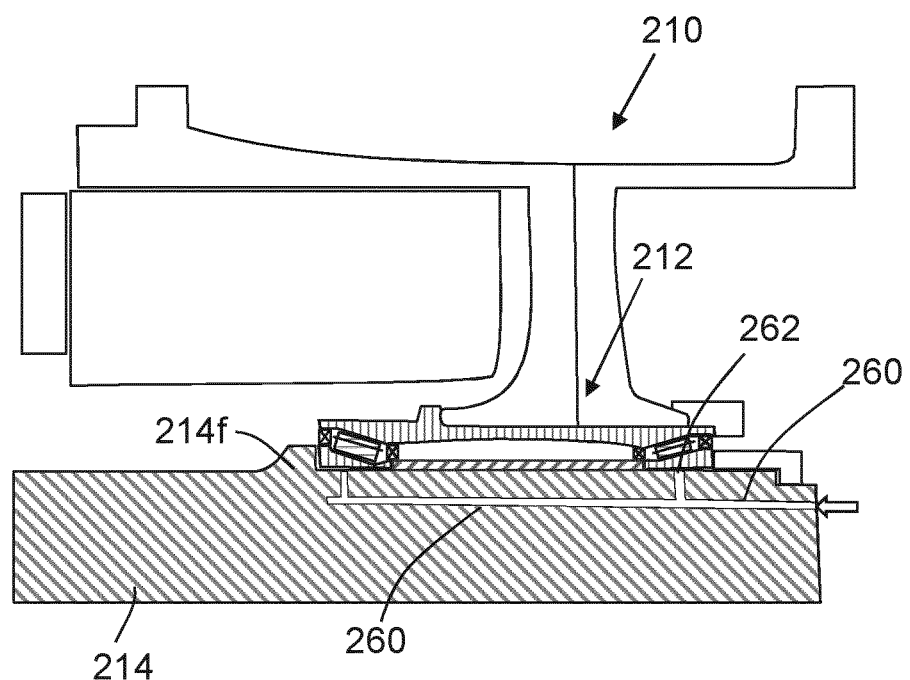
FIG. 13 shows in cross-section an aircraft wheel and associated bearing unit according to a second embodiment.

FIG. 13 shows a wheel 210 and bearing unit 212 according to a second embodiment which is similar to that of the first embodiment. Only the main differences will now be described. Firstly, there is no sleeve on the axle 214. Instead the axle includes an integrally formed flange 214f for receiving the bearing unit 212, which is shown abutting the flange 214f in FIG. 13. The axle has a series of hydraulic lines 260 formed within it, which exit the axle 214 at various locations 262 spaced around the exterior surface of the axle that, in use, is in contact with the inner diameter of the bearing unit 212. The hydraulic lines 260 are pressurised to assist in the releasing of the bearing unit from the axle.

FIG. 14 shows a flowchart illustrating a method 300 (according to a third embodiment) of manufacturing and mounting a sealed bearing unit being in accordance with the unit shown in FIG. 4. The method starts (represented by box 301) with arranging a first set of tapered roller bearings between inner and outer raceway structure and a second set of tapered roller bearings between the same inner and outer raceway structure. The roller bearings are in an unloaded position, there being endplay. The roller bearings are spaced apart from each other along the rotational axis by a spacer. As a subsequent step (although it could be performed at a different time), the step being represented by box 302, a predetermined amount of grease is added to the first set of tapered roller bearings and a predetermined amount of grease is added to the second set of tapered roller bearings. Then as a later step (represented by box 303) each set of tapered roller bearings is sealed with a pair of seals so that the predetermined amount of grease is retained within the bearing unit. It could of course be the case that the seals are in situ before the grease is added via one or more dedicated channels for that purpose.

The spacer is sized such that when the first set of tapered roller bearings and second set of tapered roller bearings are urged together, the spacing structure is under axial compression when the correct axial preload for the tapered roller bearings is applied. Thus as a subsequent step (although again the step could be performed at a different stage in the process)—represented by box 304, the first set of tapered roller bearings are urged towards the second set of tapered roller bearings until the spacing structure undergoes axial compression. At this point, it is assumed (correctly) that the tapered roller bearings are correctly seated and preloaded. A wheel may then be mounted on the axle, with the rotation of the wheel about the axle being facilitated by the bearing unit. Thus, there is a step (represented by box 305) of moving the wheel into position over the bearing unit and then fixing it in place with a wheel nut. As part of this step (box 305) it may also be that a brake pack assembly is mounted on the axle in advance of, but immediately before, the wheel.

FIG. 15 shows a flowchart illustrating a method 400 (according to a fourth embodiment) of servicing an aircraft landing gear assembly having a wheel, bearing unit and brake pack in accordance with the unit shown in FIG. 4. The method starts (represented by box 401) with removing the wheel and brake pack (but not the brake calliper) from the landing gear axle, leaving the associated bearing unit in situ, then (represented by box 402) servicing them (i.e. checking, maintaining and if necessary repairing the wheel and brake pack), then (represented by box 403) securing to the axle a serviced/replacement wheel and brake pack (which may include new or replacement parts, or which may be the same wheel and brake pack as removed by step 401) using the same bearing assembly, which has remained in situ during step 402. Thus, the bearings need not be inspected or maintained at the same time as the wheel and/or brake pack. The bearing unit may be designed to be serviced fewer than one in ten service intervals for servicing the wheel/brake packs. If and when the bearing unit is serviced it may be subjected to cleaning, an NDT inspection, an overhaul, a bearing reset, re-greasing, replacement of seals, and/or replacement of other parts (for example being returned to a bearing manufacturer for that purpose).

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The spacer between the bearing sets could be formed as part of one or both of the inner raceways.

The wheel need not be formed as a split rim wheel.

Other sensors could be provided in the bearing unit, such as one or more temperature sensors, inertial sensors, orientation sensors, load sensors, vibration sensors, other active health monitoring sensor(s), or the like. Such sensors could be active or reactive and could provide information that can be used for brake controls. A sensor in the void could be combined with a load sensor to enable improvements to the braking system, possibly on a wheel by wheel basis.

The bearing unit has an outer surface for receiving a wheel. That same outer surface may optionally be configured to engage with part of the brake pack.

The bearing unit may include one or more thermal barriers. For example, the outer raceway may include a thermally insulating material. The thermal barriers may be provided to prevent or minimise heat transfer from the brake through the wheel. The thermal barriers may be provided as one or more coatings, for example comprising a bonding coat, an insulating layer (which may be in the form of a thermal barrier coating, for example having a metallic bond coat [for bonding to the metal substrate], a thermally-grown oxide layer, and a ceramic topcoat).

Other embodiments of the bearing unit could be used on a Body LG ("BLG") and/or a Wing LG ("WLG").

The bearing rollers could, instead of being made from silicon nitride, be made from advanced bearing steel material or be coated with industrial diamond.

In some embodiments, the bearings may be set up with a pre-load but also have endplay in operation.

The bearing unit may be a single component that is for example provided and/or manufactured separately from of the wheel and axle. The bearing unit may be provided as a single line-replaceable unit ("LRU").

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. An aircraft landing gear wheel packaged bearing unit, comprising:
   an outer surface,
   an inner surface,
   an inner raceway,
   an outer raceway,
   wherein the outer surface receives an aircraft wheel and the inner surface receives an axle,
   a first set of tapered roller bearings, and a second set of tapered roller bearings, spaced apart in an axial direction, each set of first and second tapered roller bearings being held between the inner raceway and the outer raceway,
   a bearing setting spacer attached to the axle which when clamped in position dictates the separation in the axial direction of the first set of tapered roller bearings from the second set of tapered roller bearings, thus enabling the roller bearings of the bearing unit to be configured in a set position and pre-loaded,
   a pre-set amount of lubricant for lubricating the first and second set of tapered roller bearings, the lubricant being retained within the bearing unit by one or more seals,
   wherein the bearing setting spacer forms part of a clamping arrangement for clamping and preloading the first set of tapered roller bearings and the second set of tapered roller bearing in the set position, and
   a fixing, separate from the clamping arrangement, comprising a first nut that secures the outer raceway to the inner surface of the wheel.

2. The packaged bearing unit according to claim 1, wherein the clamping arrangement further includes a second nut configured for retaining preloading and/or setting the first and second set of tapered roller bearings, and for securing the bearing unit to the axle.

3. The packaged bearing unit according to claim 1, wherein the bearing unit includes a void between the first set of tapered roller bearings and the second set of tapered roller bearings.

4. The packaged bearing unit according to claim 1, wherein the bearing unit includes one or more sensors.

5. The packaged bearing unit according to claim 1, further comprising one or more thermal barriers arranged to reduce the flow of heat energy from brakes associated with the wheel to one or more of the first and second set of tapered roller bearings.

6. The packaged bearing unit according to claim 1, with the first and second set of tapered roller bearings are seated and under pre-load position.

7. The packaged bearing unit according to claim 1, wherein the amount of pre-loading of the tapered roller bearings can be controlled independently of the mounting of the wheel on the axle of an aircraft landing gear.

8. An aircraft including a landing gear on the axle of which is mounted the bearing unit according to claim 1.

* * * * *